(12) United States Patent
Smith et al.

(10) Patent No.: US 7,142,863 B1
(45) Date of Patent: Nov. 28, 2006

(54) METHOD OF DEPLOYING A FIXED WIRELESS ACCESS COMMUNICATIONS NETWORK SUCH THAT A SPECIFIED LEVEL OF LINK PERFORMANCE IS MAINTAINED

(75) Inventors: Martin Smith, Chelmsford (GB); Julius Robson, Dunmow (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/512,910

(22) Filed: Feb. 25, 2000

(51) Int. Cl.
*H04Q 7/20* (2006.01)
*H04M 1/00* (2006.01)

(52) U.S. Cl. ............... 455/446; 455/452.1; 455/452.2; 455/456.1; 455/550.1

(58) Field of Classification Search ............... 455/446, 455/447, 448, 449, 452.1, 452.2, 453, 454, 455/450, 456.1, 456.2, 456.5, 456.6, 435.2, 455/439, 422.1, 513
See application file for complete search history.

(56) References Cited

U.S. PATENT DOCUMENTS

| | | | | |
|---|---|---|---|---|
| 4,654,867 A | * | 3/1987 | Labedz et al. ............... 455/438 |
| 5,493,679 A | * | 2/1996 | Virgil et al. ............. 707/104.1 |
| 5,848,358 A | * | 12/1998 | Forssen et al. ............. 455/437 |
| 6,184,829 B1 | * | 2/2001 | Stilp .......................... 342/387 |
| 6,317,599 B1 | * | 11/2001 | Rappaport et al. .......... 455/446 |
| 6,499,006 B1 | * | 12/2002 | Rappaport et al. ............ 703/20 |
| 6,625,454 B1 | * | 9/2003 | Rappaport et al. .......... 455/446 |
| 6,631,267 B1 | * | 10/2003 | Clarkson et al. ............ 455/446 |

\* cited by examiner

*Primary Examiner*—Tony T. Nguyen
(74) *Attorney, Agent, or Firm*—Barnes & Thornburg LLP

(57) ABSTRACT

Current deployment methods for fixed wireless access communications networks typically give rise to a trade off between link performance and capacity. It is difficult to maintain specified levels of link performance while maximizing capacity. When a request to change a fixed wireless access network is received, for example, by adding a subscriber, moving a subscriber or adding a sector to a base station, the link performance at each communications link is determined. For example, by measuring the link performance at each link or by predicting or estimating these link performance levels. If the proposed change to the network does not compromise link performance, that is, the predicted or actual link performance levels are greater than a specified level, proposed change is implemented. Otherwise the now subscriber is placed on hold, pending change to the network such as addition of a new base station or sector. Estimates of the link budgets for each communications link are calculated for "worst case" scenario situations. This may be done using known deployment tools. The method is used in conjunction with fixed frequency planning or without fixed frequency planning. In the absence of fixed frequency planning, deployment of the communications network is eased.

17 Claims, 9 Drawing Sheets

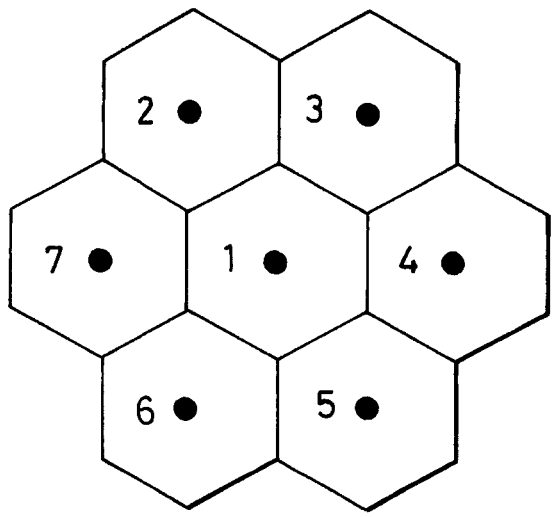
Fig. 1  N=7
(PRIOR ART)
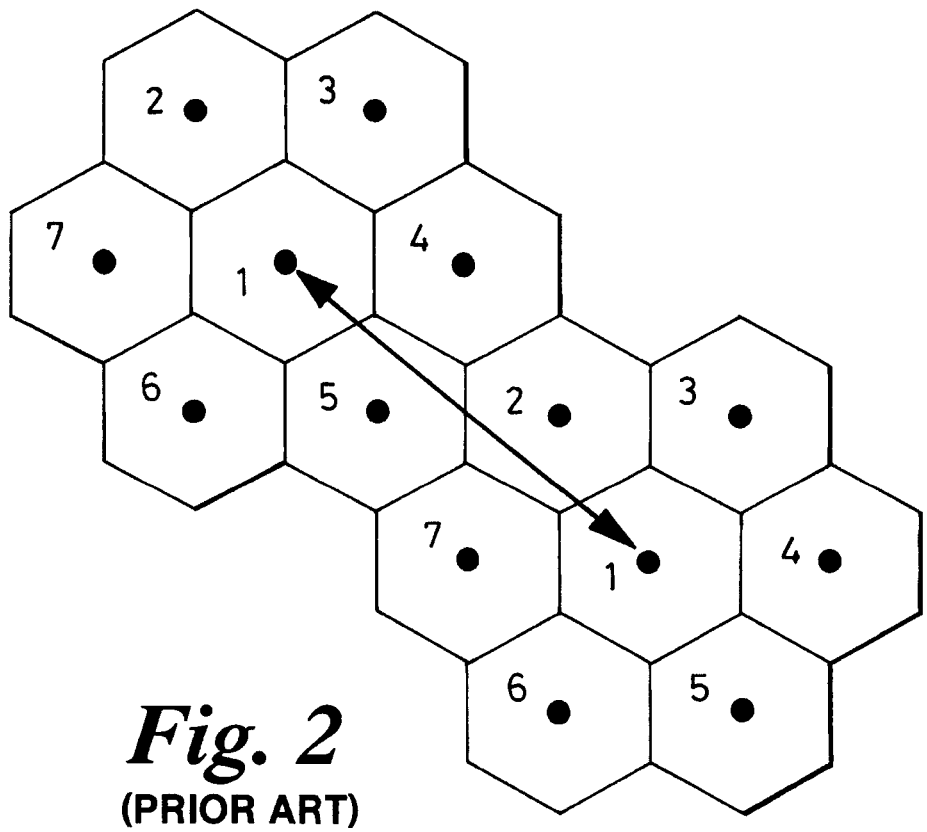
Fig. 2
(PRIOR ART)

METHOD OF DEPLOYING A FIXED WIRELESS ACCESS COMMUNICATIONS NETWORK SUCH THAT A SPECIFIED LEVEL OF LINK PERFORMANCE IS MAINTAINED

BACKGROUND OF THE INVENTION

1. Field of the Invention

This invention relates to a method of deploying a fixed wireless access communications network such that a specified level of link performance is maintained. The invention also relates to a computer system for implementing the method, a computer program for controlling the computer system and a communications network deployed using the method.

2. Description of the Prior Art

Fixed wireless access communications networks use a fixed antenna at each subscriber premises where the antenna is typically directional. Each subscriber antenna communicates with a base station (to which it is directed, in the case that direct antennas are used). Each base ton is in turn connected to a physical communications network such as a public switched telephone network via a transmission link. A typical base station supports many subscribers, for example 500 to 2000 subscribers in the IONICA (trade mark) system. The resulting fixed wireless access system is capable of delivering a wide range of access services such as POTS (public operator telephone service), ISDN and broadband data.

When a fixed wireless access communications system is initially deployed, a base station of a particular capacity is installed to cover a particular populated area. The capabilities of the base station are designed to be commensurate with the anticipated coverage and capacity requirement. Subscribers' antennas are mounted on a building, for instance, on a chimney, and upon installation are normally directed towards the nearest (or best signal strength) base station or repeater antenna (any future reference to a base station shall be taken to include a repeater).

In order to meet the capacity demand, within an available frequency band allocation, fixed wireless access systems divide a geographic area to be covered into cells. Within each cell is a base station with which the subscribers stations communicate; the distance between the cells refusing the same frequency being determined such that co-channel interference is maintained at a tolerable level. When the antenna on the subscriber premises is installed, an optimal direction for the antenna is identified using monitoring equipment. The antenna is then mounted so that it is positioned towards the optimal direction.

As already mentioned, fixed wireless access systems divide a geographic area to be covered into cells. For initial planning and design purposes these cells may be represented as hexagons, each cell being served by a base station (in the centre of the hexagon) with which a play of subscriber stations within the cell (hexagon) communicate. When detailed cell planning is performed the ideal hexagonal arrangement can start to break down due to site constraints or for radio propagation reasons. The number of subscriber stations which can be supported within each cell is limited by the available number of carrier frequencies and the number of channels per frequency.

Base stations are expensive, and require extensive effort in obtaining planning permission for their erection. In some areas, suitable base station sites may not be available. One problem in fixed wireless access system design is to have as few base stations as possible, whilst supporting as many subscriber stations as possible. This helps to reduce the cost per subscriber in a fixed wireless access system. An on-going problem is to increase the traffic carrying capacity of base stations whilst at the same time keeping interference levels within acceptable bounds. This is referred to as trying to optimise or increase the carrier to interference level ratio. By increasing the traffic capacity the number of lost or blocked calls is reduced and call quality can be improved. (A lost call is a call attempt that falls.)

Cells are typically grouped in clusters as shown in FIG. 1. In this example, a duster of seven cells is shown. Within each cluster 7×6=42 frequencies am each used once. The term "frequency re-use factor" is used to refer to the number of sets of frequencies that the total number of available frequencies is divided into. In this case, the frequencies are divided into 7 sets, one for each cell in a cluster.

FIG. 2 shows how a larger geographical area can be covered by re-using frequencies. In FIG. 2 each frequency is used twice, once in each cluster. The frequency re-use factor N is 7: Co-channel interference could occur between cells using the same frequencies and needs to be guarded against through cell planning. When the capacity of a cell or duster is exhausted one possibility is to sectorize each cell. This involves using directional antennas on the base station rather than omnidirectional antennas. The 360° range around the base station is divided up into a number of sectors and bearers are allocated to each sector. In this way more bearers can be added whilst keeping interference down by only using certain frequencies in certain directions or sects. The frequency reuse factor is a product of the base re-use factor and the sector re-use factor.

Known approaches for seeking to increase system capacity include fixed frequency planning (FFP) which involves carefully planning re-use patterns and creating sector designs in order to reduce the likelihood of interference. For example, FIG. 3 shows an example of a fixed frequency plan with a frequency re-use factor N of 4 and which is known as the "mirror method". Each sector with the same reference numeral is constrained to use a specific set of frequencies that are different from the frequencies used by sectors with different reference numerals. There are four different reference numerals 31, 32, 33, 34, for each of four different frequency sets. The letters H and V are used to denote horizontal and vertically polarised frequency channels. However, fixed frequency planning is problematic because it is often difficult to map a frequency plan onto an actual communications network. This mapping process is complex time consuming and adds to cost.

As well as this fixed frequency planning is limited in that it is difficult to maximise capacity whilst at the same time maintaining specified link performance levels for all subscribers. Whilst the fixed frequency plan aims to reduce interference, specified link performance levels are not maintained for all individual subscribers. As subscribers are added to the fixed frequency planned network, effects on the link performance provided to other subscribers result. Fixed frequency planned communications networks thus typically give rise to some subscriber locations for which link performances are relatively low compared with other subscriber locations in the same communications network. In order to ensure no problem links in a fixed frequency planning network, then a very large frequency re-use factor would be required. However, this is not practical because the high re-use factor would lead to a low capacity.

Thus it is difficult to provide a method of frequency planning for a fixed wireless access communications system such that specified link performance levels are maintained and capacity is maximised whilst at the same time the problems associated with fixed frequency planning are reduced. The term "fixed frequency plan" is used to refer to a scheme which specifies a regular pattern of base station locations and a pattern of frequency use for communications links between those base stations and subscriber stations. When a communications network is deployed according to a fixed frequency plan, the base station locations and pattern of frequencies used for the communications links needs to adhere to the fixed frequency plan closely, in order for the benefits of the fixed frequency plan to be achieved.

It is accordingly an object of the present invention to provide a method of deploying a fixed wireless access communications network such that a specified level of link performance is maintained which overcomes or at least mitigates one or more of the problems noted above.

SUMMARY OF THE INVENTION

Current deployment methods for fixed wireless access communications networks typically give rise to a trade off between link performance and capacity. It is difficult to maintain specified levels of link performance whilst maximising capacity. When a request to change a fixed wireless access network is received, for example, by adding a subscriber, moving a subscriber or adding a sector to a base station, the link performance at each communications link is determined. For example, by measuring the link performance at each link or by predicting or estimating these link performance levels. If the proposed change to the network does not compromise link performance, that is, the predicted or actual link performance levels are greater than a specified level, then the proposed change is effected. Otherwise the new subscriber is placed on hold, pending change to the network such as addition of a new base station or sector. Estimates of the link budgets for each communications link are calculated for "worst case" scenario situations. For example, this may be done using known deployment tools. This method is used in conjunction with fixed frequency planning or without fixed frequency planning. If no fixed frequency plan is deployment of the network is simplified.

According to an aspect of the present invention there is provided a method of deploying a fixed wireless access communications network such that a specified level of link performance is maintained, said network comprising a plurality of base stations end a plurality of subscriber stations, each subscriber station being arranged to communicate with one of the base stations via a communications link, said method comprising the steps of:—
  receiving a request to change the communications network;
  determining a level of link performance provided by each of the communications links taking into account the proposed change; and
  effecting the proposed change if each of said determined levels of link performance are greater than the pre-specified level of link performance.

A corresponding computer system is also provided, for deploying a fixed wireless access communications network such that a specified level of link performance is maintained, said network comprising a plurality of base stations and a plurality of subscriber stations, each subscriber station being arranged to communicate with one of the base stations via a communications link, said computer system comprising:—
  an input arranged to receive a request to change the communications network;
  a processor arranged to determine a level of link performance provided by each of the communications links taking into account the proposed change to the communications network; and wherein said processor is further arranged to allow the proposed change to be effected if each of said determined levels of link performance are greater than the pre-specified level of link performance.

A corresponding computer program is provided stored on a computer readable medium and arranged to control a computer system such that a fixed wireless access communications network may be deployed whilst a specified level of link performance is maintained, said network comprising a plurality of base stations and a plurality of subscriber stations, each subscriber station being arranged to communicate with one of the base stations via a communications link, said computer program being arranged to control said computer system such that:—
  a request is received to change the communications network;
  a level of link performance provided by each of the communications links is determined taking into account the proposed change; and
  said change is affected if each of said determined levels of link performance are greater than the pre-specified level of link performance.

A corresponding fixed wireless access communications network is provided comprising:—
  a plurality of base stations and a plurality of subscriber stations;
  a communications link between each subscriber station and one of the base stations; and wherein each of said communications links provides a specified level of link performance.

Various advantages are thus achieved. Firstly, link performance levels are maintained. Also, it is not necessary to use complex terrain and building databases in order to calculate estimates of the link performance at each link. Instead a simple model such as a 2-D line of sight model can be used to estimate a "worst case" scenario. By using an accurate terrain database to calculate estimates of the rink performance at each link, the capacity of the network is further increased. However, it is not essential to use such terrain databases.

The method of deploying a fixed wireless access communications network such that a sped level of link performance is achieved may be used either with a fixed frequency plan or without a fixed frequency plan. If no fixed frequency plan is used, further advantages are achieved. The complex task of mapping a frequency plan onto a grid of actual base stations is avoided. Also, base station sites can be optimised for site cost, coverage and subscriber density. As well as this, any working fixed wireless access communications network can be taken and developed by adding new subscribers using the method described above without the need to adhere to a fixed frequency plan. No reorganisation of frequencies in the existing network is required.

Further benefits and advantages of the invention will become apparent from a consideration of the following detailed description given with reference to the accompanying drawing which specify and show premed embodiments of the invention.

BRIEF DESCRIPTION OF THE DRAWINGS

FIG. 1 shows a cluster of seven cells according to the prior art that are represented as hexagons.

FIG. 2 shows two clusters of seven cells according to the prior art where each frequency is used once in each cluster.

FIG. 9c is a single channel plot of the communications network of FIG. 9a.

DETAILED DESCRIPTION OF THE INVENTION

Embodiments of the present invention are described below by way of example only. These examples represent the best ways of putting the invention into practice that are currently known to the Applicant although they are not the only ways in which this could be achieved.

Figure 5:
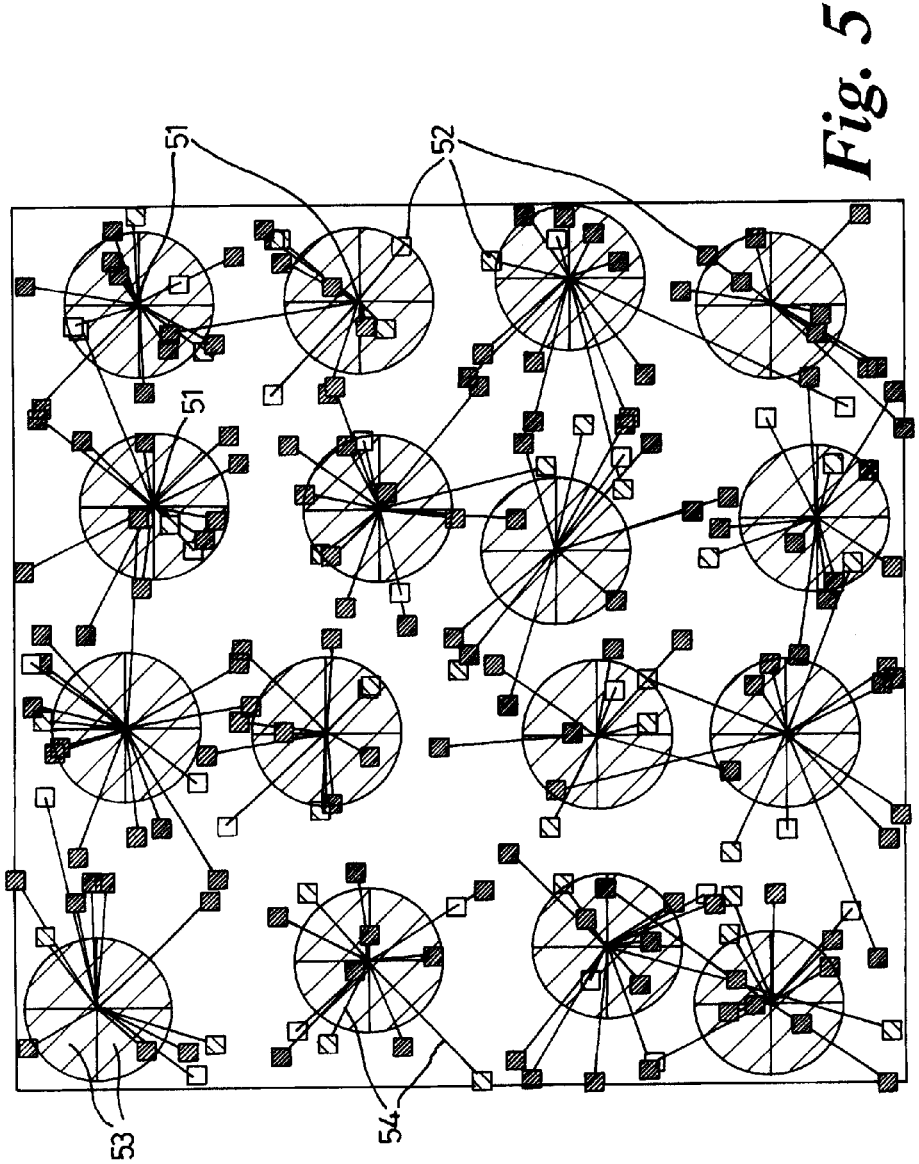
FIG. 5 is a schematic diagram of a fixed wireless access communications network which has been deployed using the method of FIG. 4.

Considering a fixed wireless access communications network such as that illustrated in FIG. 5 a plurality of base stations 51 are provided each of which is connected to a backbone network (not shown) as is known in the art. Each base station supports a plurality of subscriber stations 52, also known as CPEs (customer premises equipment). The circular regions drawn around the base stations 51 in FIG. 5 are provided for reasons of clarity only to indicate individual cabs and do not represent the ante footprints or fields of the base stations. Each cell is divided into four sectors 53 (represented by the division of each circular region into quarters). Eight channels are used. Each such subscriber station within a sector communicates with its associated base station via a communications link 54 at one of eight different frequencies. It is not essential to use directional antennas at each subscriber station. It is also possible to use omni-directional antennas at each subscriber station.

The term "link performance" is used to refer to any measure of the functionality of a communications link. For example, this measure may be provided in terms of a carrier to interference level ratio, the number of errors observed on a link over a specified period of time or any other suitable metric.

Figure 3:
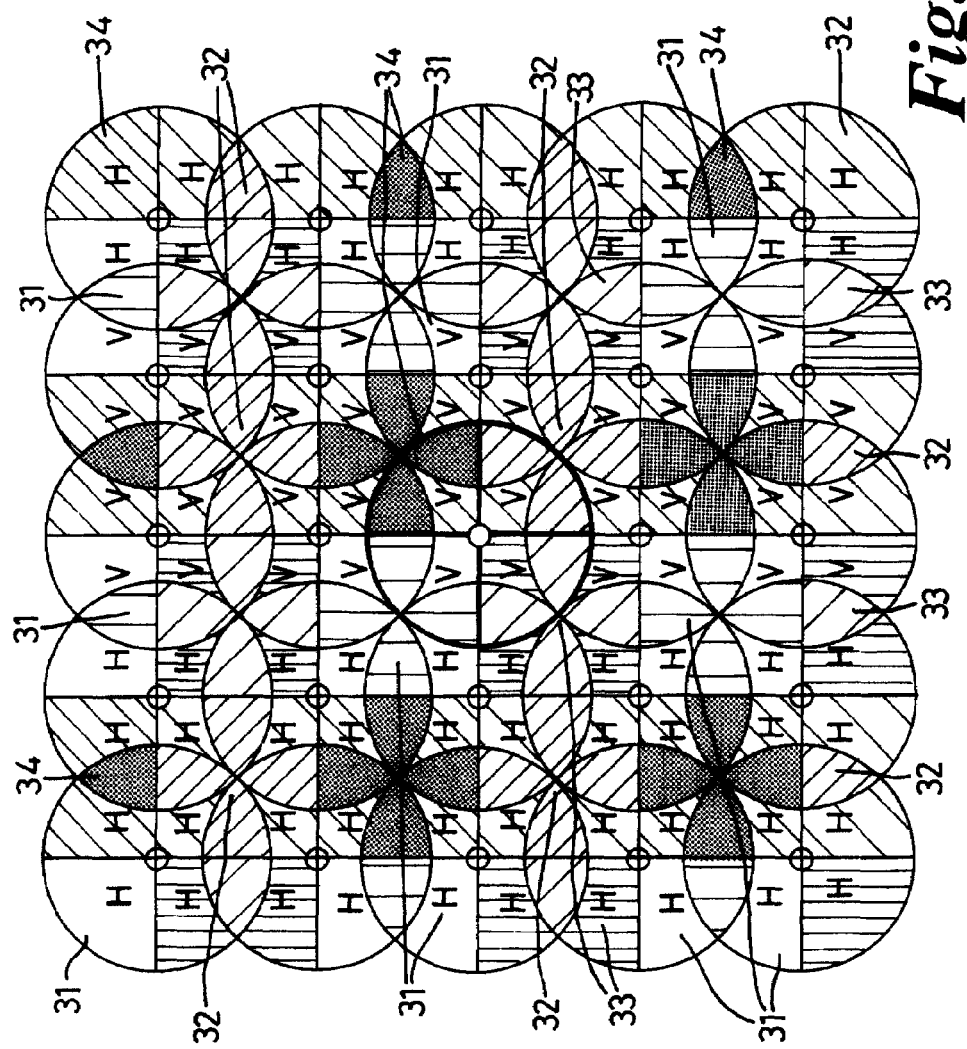
FIG. 3 snows a fixed frequency plan according to the prior art with a frequency reuse factor of 4 according to the so called "mirror method".
Figure 4:
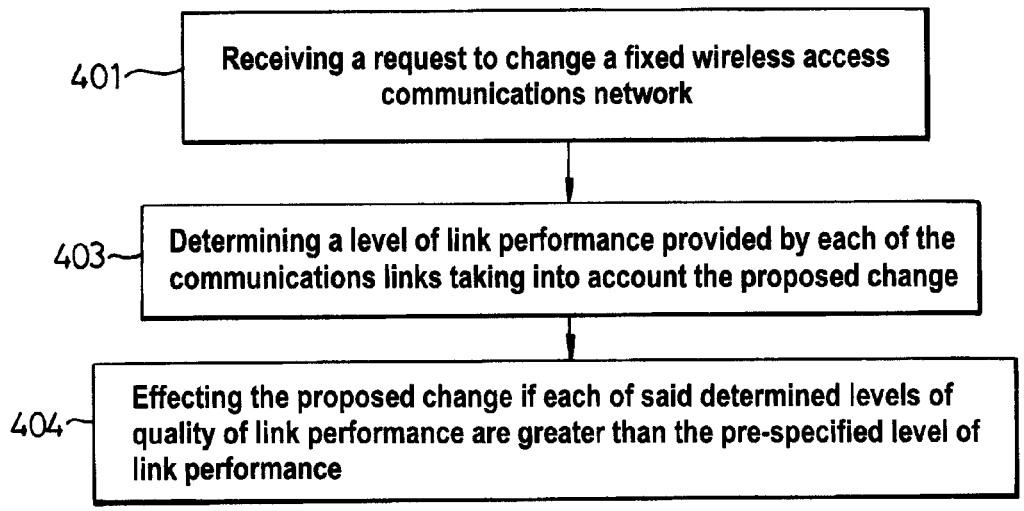
FIG. 4 shows a flow diagram of a method of deploying a fixed wireless access communications network such that a specified level of link performance is provided.

FIG. 4 is a flow diagram of a method for deploying a fixed wireless access communications network such that a specified level of link performance is maintained at each link in the network. The fixed wireless access communications network may be an existing working network that has been deployed according to a fixed frequency planning scheme, or may be any other working fixed wireless access communications network. For example, the fixed wireless ass communications network of FIG. 5 is suitable despite the fact that this is not arranged according to a fixed frequency planning scheme.

A request is made to change the communications network. For example, this may be a request to add a proposed subscriber station to the communications network or to change the location of an existing subscriber station. Other examples of requests for change include addition of a sector to a base station. In the case that a request is made to add a new subscriber, a base station is selected with which the proposed subscriber station is to communicate. This selection may be made on the basis of the information about the location of the proposed subscriber station. For example, the nearest base station with which a clear "line of sight" may be established may be selected. Alternatively, if that nearest base station is full then another suitable base station is selected.

In order to maintain a level of rink performance across the network, the level of link performance at each communications link 54 is determined (box 403 of FIG. 4). For example, this may be done by measuring the level of link performance at each link or by calculating an estimate of these levels of link performance. These measurements or calculations are done taking into account the effect of the proposed change (such as a new subscriber) on the rest of the network. If the determined levels of link performance at each link are greater than a specified level then the change to the network is effected (see box 404 of FIG. 4). In this way link performance for each link in the network is maintained at leas at the specified level. Preferably, the level of link performance for both the uplink communication and the downlink communication parts of the link are determined.

In the case that measurements of the rink performance are performed at each link, these measurements are unlikely to represent the worst case situation at that link. For example, during heavy rainfall, link performance may be significantly detrimented especially for applications involving high data transmission rates. Because of this the link performance measurements need to be adjusted to take worst case situations such as heavy rainfall conditions into account. The measurements may be carried out automatically by equipment installed at each subscriber location and the measurement data communicated via the communications network to an operator or management system. The measurement may be carried out effectively continuously to monitor the link performance.

In a preferred embodiment, instead of taking actual measurements of the link performance, estimates of this are calculated by using a deterministic model of the communications network to predict link budgets. Any suitable deployment toot may be used to calculate estimates of the link performances. For example, the EDX Signal Pro (trade mark) and Planet (MSI) (trade mark) deployment tools may be used. An example of a method for predicting or estimating link budgets for each communications link 54 using a model of the communications network is described in more detail in the section headed "calculation of link performance levels"0 below.

Figure 6:
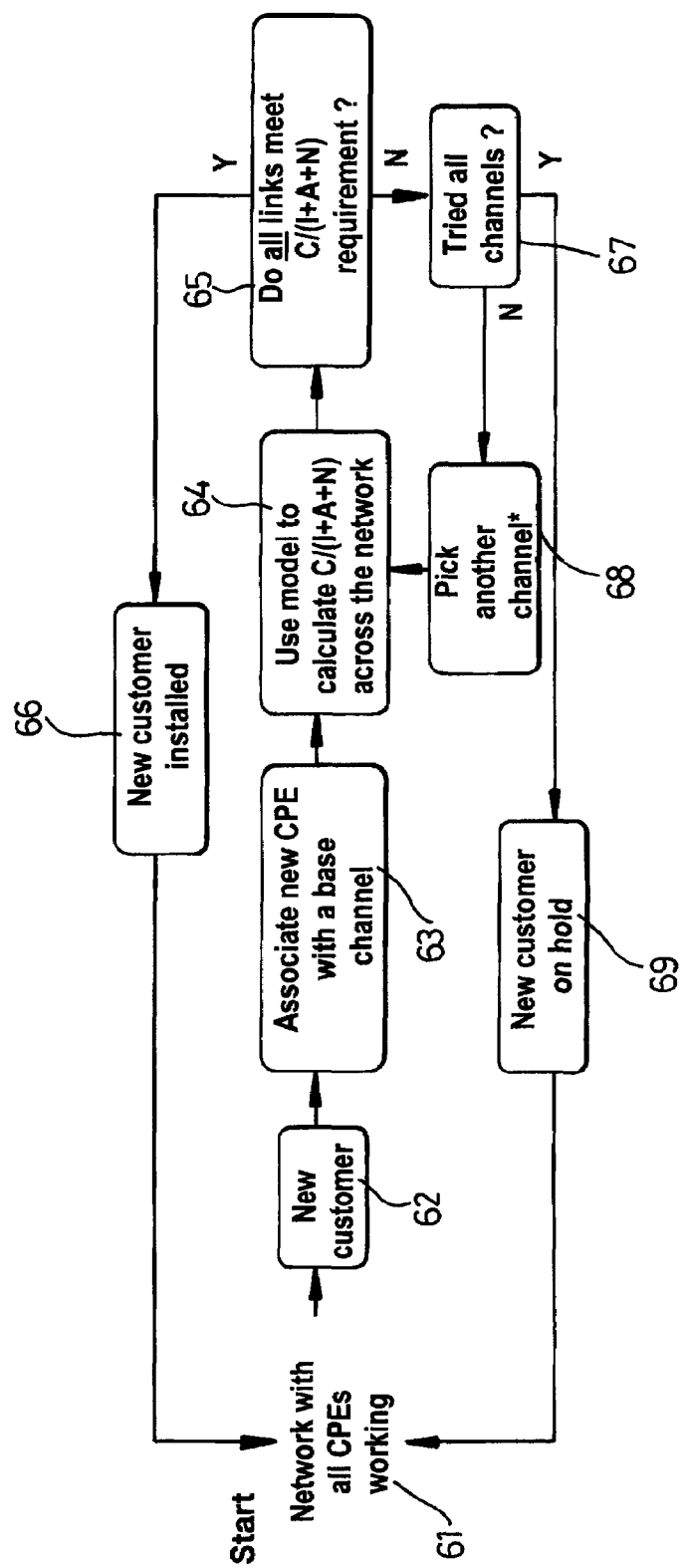
FIG. 6 is a flow diagram of the method of FIG. 4 giving more detail.

As mentioned above, one example of a requested change to the network is a request to add a subscriber station. FIG. 6 is a flow diagram of a method of adding a subscriber to a communications network. This method is discussed in detail below and also applies to other changes to the communications network besides adding new subscriber stations. Beginning from a communications network in which all the subscriber stations or CPEs are working (box 61) a request for a new customer or subscriber station is made (box 62). The proposed new customer is associated with a base station in the communications network and also with one of a plurality of communications channels (box 63). The selected channel is chosen on the basis of any fixed frequency plan that is used to deploy the communications network. If no fixed frequency plan is used, the selected channel can be chosen from the entirety of the available channels in an arbitrary manner. Alternatively, an algorithm for choosing the channel may be used in order to select a suitable channel quickly. This is discussed in more detail below.

A model of the communications network is then used to calculate an estimate of the link performance provided by each communications link 54 in the network. Any suitable indicator of link performance may be estimated. For example, the value $C/(I+A+N)$ is calculated where C indicates the carrier level, I indicates the interference level, A indicates the adjacent channel interference level and N indicates the noise level. More information about calculating this value is described in the section headed "calculation of link performance levels" below.

If all the links 54 have an estimated link performance indicator that is greater than a specified value then the proposed new subscriber is added to the communications network (see boxes 66 and 66 of FIG. 6). However, if one or more links 54 do not meet the specified link performance level, then any other available channel for use at the selected base station is chosen and the estimated link performance indicator re-calculated. This is done by checking to see whether all the available channels have been tried (see box 67 in FIG. 6) and if not picking one of the untried channels (box 68). The choice of channels may or may not be constrained to a fixed frequency plan. Once all the channels have been tried, and if the link performance requirement is not met, the proposed subscriber is placed on hold (box 69).

Using this method new subscribers are only added to the communications network if they do not compromise the link performance in the communications network. If new subscribers cannot be added for this reason, they are placed on hold pending a change to the communications network such as deployment of a new base station or sector. Similarly, any other requested change is only effected if ft does not compromise link performance.

The method of deploying a fixed wireless communications network described above may be implemented by a computer system. Any suitable type of computer system may be used and this may be integrated into the communications network itself. A graphical user interface may be provided in order that the network operator is able to control the computer system and view results of the system. Preferably the computer system is located at a node in the communications network and is arranged to receive inputs of information about the communications network.

Even when using the method described above link performance can exceptionally be degraded. For example, in the event of equipment problems, multipath interference or small intense rain cells.

A hold ratio may also be calculated as described below, in order to provide a measure of network growth. Each attempt to add a new subscriber is termed a "placement attempt". The hold ratio (HR) is given by the number of proposed subscribers who are paced on hold divided by the total number of placement attempts. This ratio is then used to indicate when (and where) a network should be improved. For example, by adding new base stations or new sectors. The hold ratio is thus particularly advantageous for use by network planners. It provides a single value indicating network performance which is to interpret and enables potential problem areas to be identified quickly.

Figure 7:
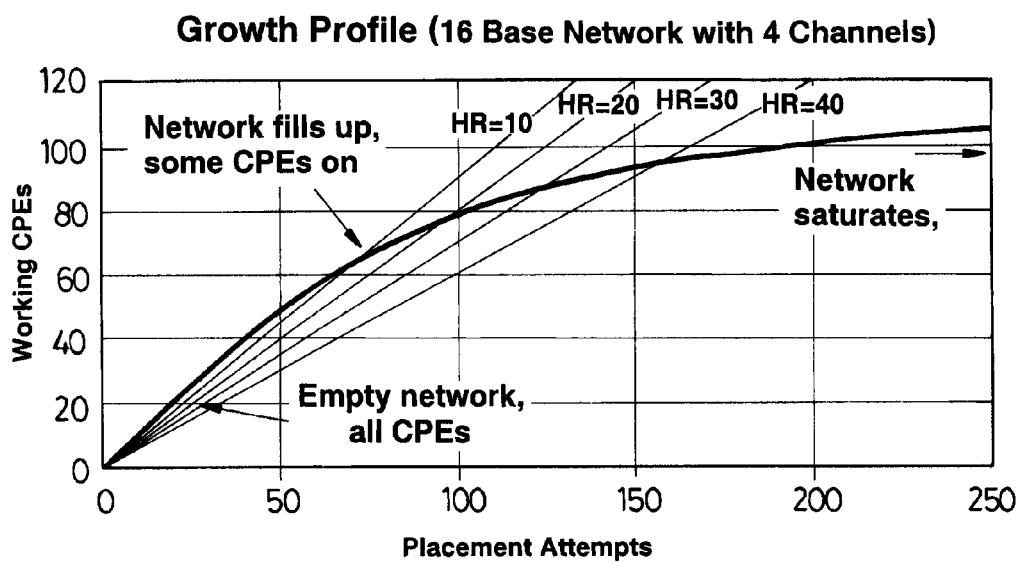
FIG. 7 is a growth profile for a fixed wireless access communications network with 16 base stations each of four sectors and with four channels.

A growth profile may be plotted and displayed to an operator via a graphical user interface or other interface means. FIG. 7 is an example of a growth profile for a communications network with 16 base stations each having four sectors and each sector having four channels. The growth profile comprises a graph of the number of subscribers supported in the communications network against the number of placement attempts that have been made. It can be seen that initially, the number of placement attempts equals the number of supported subscribers. However, as the number of placement attempts increases, the network fills up and eventually saturates. Once saturated few new subscribers are added and the number of supported subscribers remains effectively constant.

The hold ratio can be used to indicate when a network should be improved, as mentioned above. For example, a network operator is able to specify a hold ratio value above which improvements to the network should be considered. The hold ratio also gives an indication of the capacity of the network. In the example given in FIG. 7, for a hold ratio of 20% the number of subscriber stations supported by the network is 76. For this network, which has 16 base stations each with four sectors and 4 channels, the maximum theoretical capacity of the network is 256 subscribers. (That is a maximum of 256 subscribers can theoretically be supported with a reuse factor of N=1.) An indication of the effectiveness or efficiency of the network is given by comparing the maximum and actual capacities. The term "effective frequency reuse factor" represented by symbol $N_{eff}$ is used to refer to the ratio of the maximum theoretical capacity to the actual capacity at a hold ratio of 20%. It is not essential to define the value of $N_{eff}$ using the actual capacity at a hold ratio of 20%. Any other suitable measure of the actual capacity can be used. In the example given in FIG. 7 $N_{eff}=256/76=3.3$. Thus the smaller $N_{eff}$ is the higher the capacity of the network.

Another problem with fixed frequency planning, is that the maximum capacity of the resulting network is limited. Using the hold ratio discussed above it is possible to assess the capacity of a network by calculating $N_{eff}$. If a 16 base station network with N=4 target reuse and using 64 QAM (QAM stands for quadrature amplitude modulation which is a measure of the amount of information that may be sent over a link in the network) is considered, then the effective reuse factor $N_{eff}$ is 7 which is poor. In one embodiment of the present invention, this problem is addressed by not using a fixed frequency plan whilst still implementing the method described above for ensuring specified link performance levels. If no fixed frequency plan is used without any means of maintaining link performance, then the resulting network could be severely compromised. This is because, subscribers could be added to the network regardless of the effect they would have on the link performance experienced by existing subscribers. In a fixed frequency planned network, the fixed frequency plan itself is designed to take into account the effect of potential subscribers on other subscriber's link performance.

Figure 8:
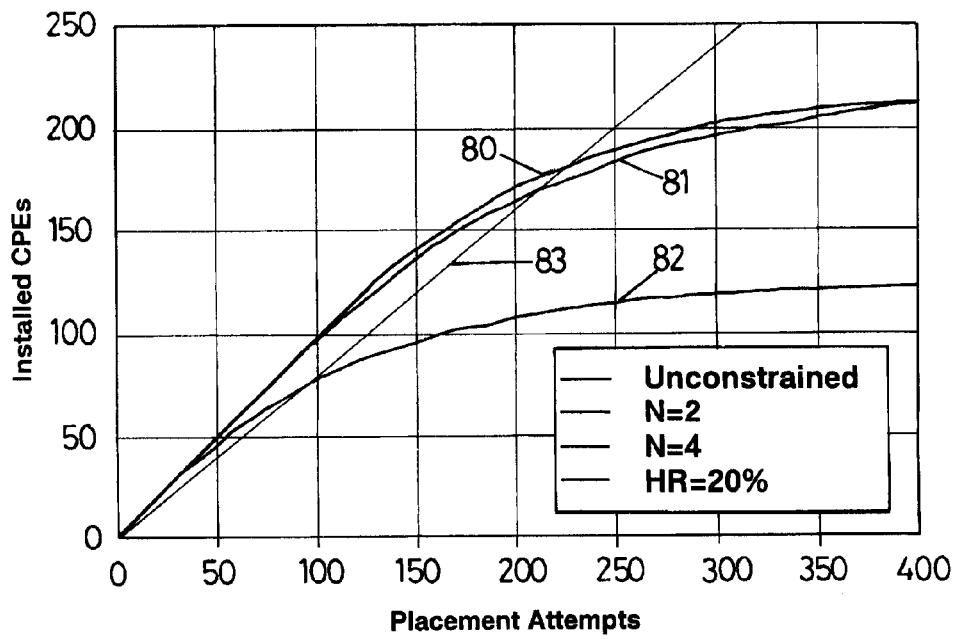
FIG. 8 shows growth profiles for a communications network with a fixed frequency plan with a re-use factor of 2, a communications network with a fixed frequency plan with a re-use factor of 4 and a communications network with no fixed frequency plan.

It has unexpectedly been discovered that by not using a fixed frequency plan whilst implementing the method of adding subscribers described above, link performance can be maintained whilst capacity is increased. This is illustrated in FIG. 8 which is a graph of the number of installed subscribers or CPEs in a fixed wireless access network against the number of placement attempts according to the method of adding subscribers described above. The particular communications network considered has 16 base stations, each of four sectors and with eight channels. Growth profiles are shown for three different situations. The first is for no fixed frequency plan (see line 80), the second for a fixed frequency plan with a frequency re-use factor of N—2 (see line 81) and the third for a fixed frequency plan with a frequency re-se factor of N=4 (see line 82). A straight line 83 is also shown representing the situation when the hold ratio is 20%. It can be seen that the curves for the N=2 condition and the unconstrained (no fixed frequency plan) condition are similar whilst that for the N-4 condition is much poorer, with the network saturating much earlier than for the other two situations. The unconstrained condition shows the best performance, with the capacity at a hold ratio of 20% being 181 subscriber stations. For the N=2 condition the capacity at a hold ratio of 20% is 169 subscriber stations and for the N=4 condition, 77 subscriber stations. For the N=4 condition, the effective reuse factor $N_{off}$ is therefore (16 bases×4 sectors×8 channels)/77=6.7. For the N=2 condition, the effective reuse factor $N_{off}$ is therefore (16 bases×4 sectors×8 channels)/169=3.0. For the unconstrained condition $N_{off}$ is (16 bases×4 sectors×8 channels)/181=2.8.

These figures demonstrate that the optimal condition is the unconstrained condition for which the fastest growth of the network and the highest capacity is achieved. By improving base station antenna patterns even greater improvements in capacity and network growth for the unconstrained condition are achieved. For example, by using base station antenna patterns which roll off rapidly and have low side and back lobes an effective reuse factor of less than 2 can be achieved.

By using no fixed frequency plan the disadvantages of fixed frequency planning are avoided. The complex task of mapping a frequency plan onto a base grid is avoided allowing base station locations to be optimised for site cost, coverage and subscriber density.

Figure 9A:
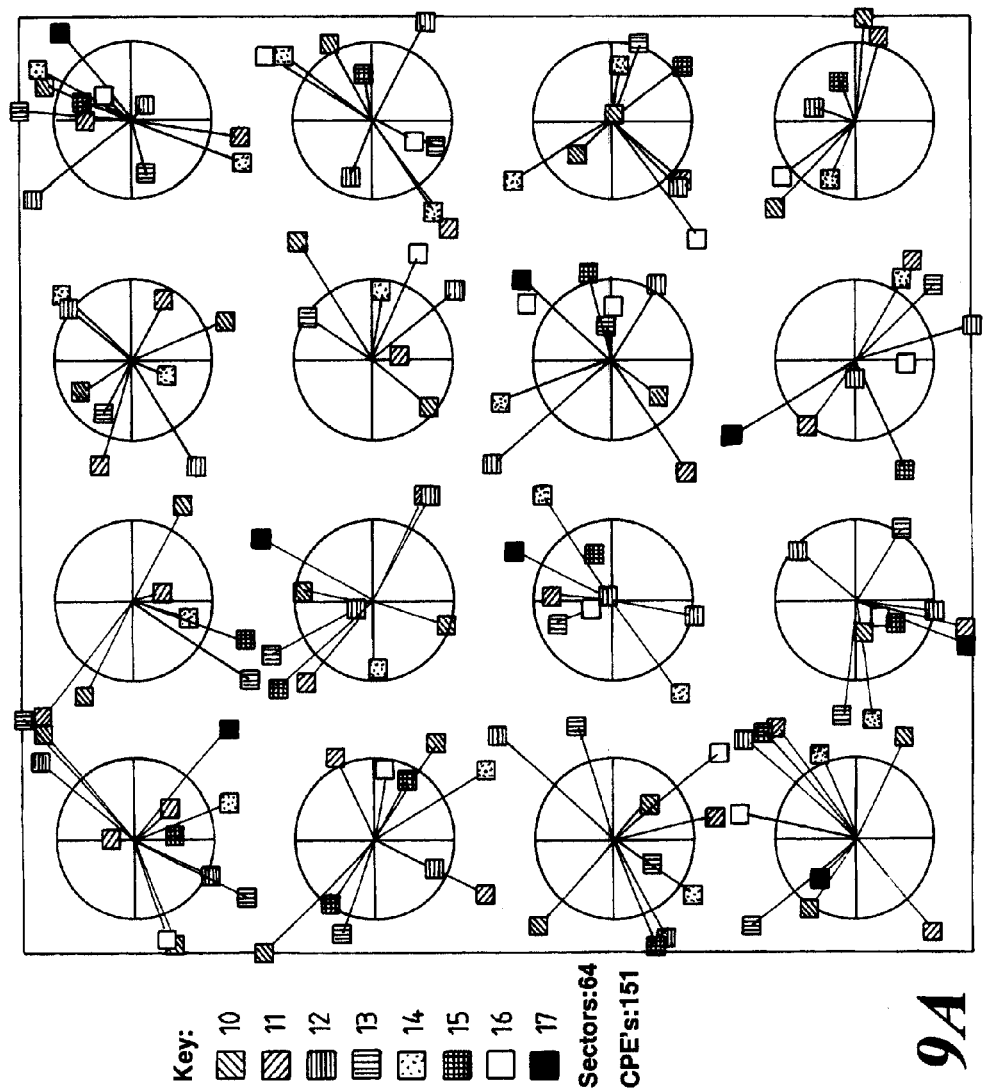
FIG. 9a shows uplink channel allocations for a communications network grown using the method of FIG. 6 and with no fixed frequency plan.
Figure 9B:
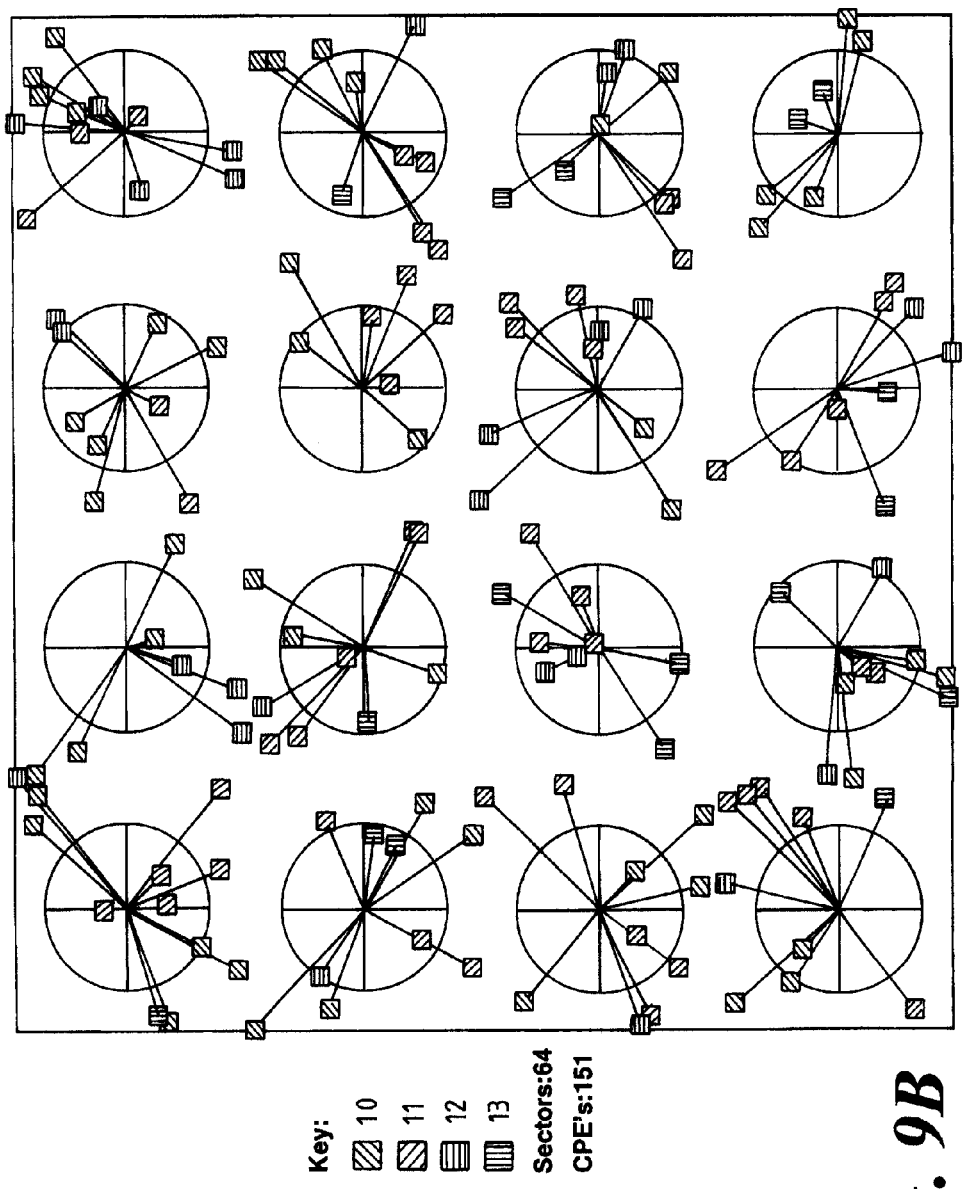
FIG. 9b shows downlink channel allocations for the communications network of FIG. 9a and with shared downlink channels.
Figure 9C:
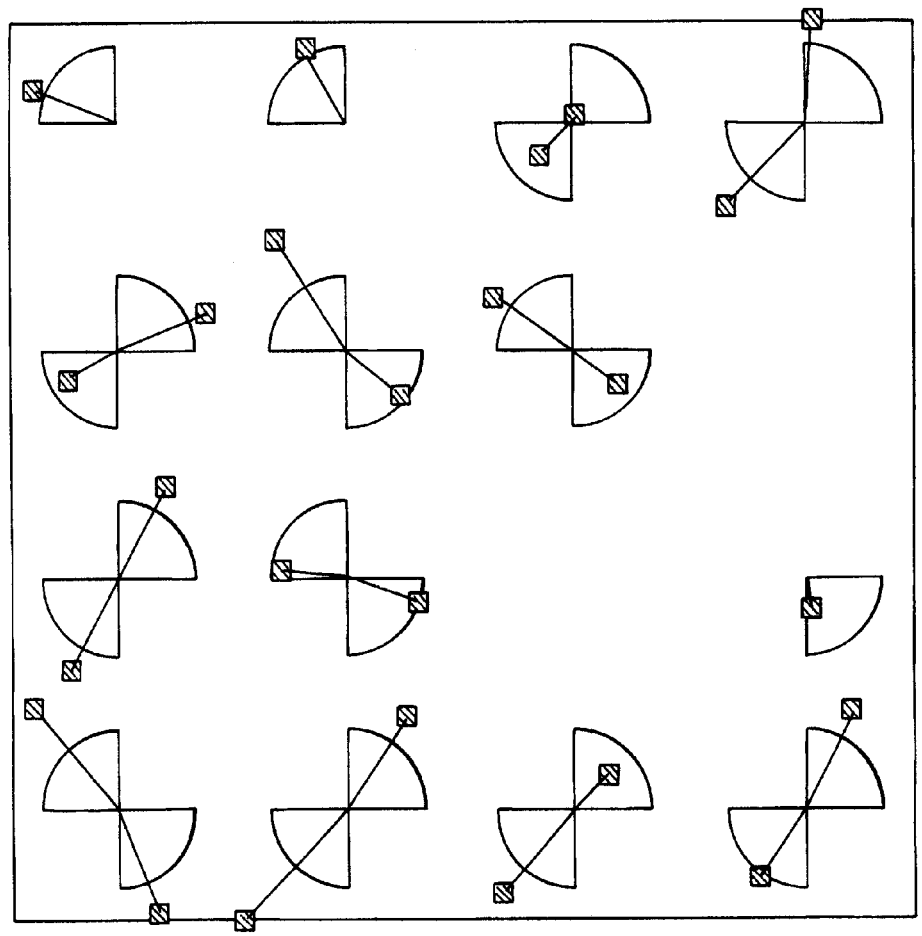

FIGS. 9*a* and 9*b* show an example of a fixed wireless access communications network which has been formed according to the method described herein and using no fixed frequency plan. 151 subscriber stations or CPEs are shown and eight different frequency channels are used in the uplink situation and four in the downlink situation. FIG. 9*a* shows the situation for the uplink channels and FIG. 9*b* for the downlink channels, with shared downlink carriers. FIG. 9*c* is a single channel plot equivalent to FIG. 9*a* and illustrates how an N-2 type re-use pattern is formed as a result of using no fixed frequency pan and the method of growing the network as described above.

Calculation of Link Performance Levels

As described above, any suitable deployment tool may be used to calculate link performance levels at each link in the communications network. In one example a deterministic modelling tool (DMT) is used for this task and is able to provide indications of link performances in both wet and dry conditions. The DMT calculates a performance indicator for each link based on an emote of the carrier level, divided by the sum of each of the interference level, the adjacent channel interference level and the noise level. Information about the location of each base station and subscriber station is used together with information about the communication links between each subscriber station and its associated base station. For example, the information about the communications links may comprise information about any fixed frequency plan used. Propagation models such as free space path loss are used in conjunction with models of the effects of rain and rain cells as required. Information about antenna patterns, power control modes and shared downlink carriers is also provided to the DMT if required. Using all the information available to it the DMT is arranged to provide estimates of link performances, where these estimates or predictions are pessimistic. That is the "worst case" scenario is considered. For example, equipment losses, gains and transmit powers are estimated according to a "worst case" scenario. Also, worst case antenna patterns are assumed. By doing this, it is possible to maintain link performance levels.

The DMT may access a clutter database in order to take multipath interference into account. Also, the DMT may take into account polarisation reuse. Neither of these are essential however.

Figure 10:
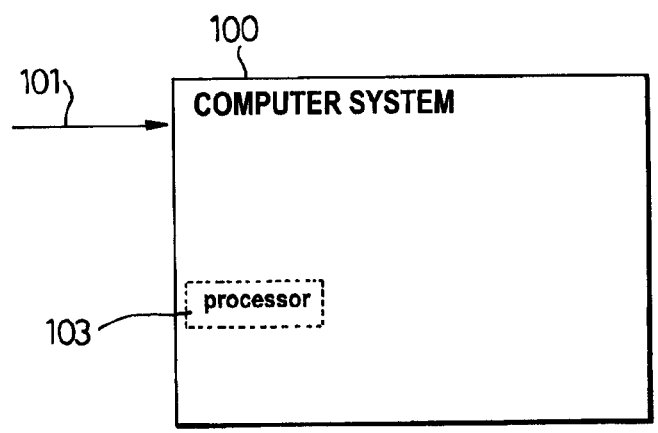
FIG. 10 is a general schematic diagram of a computer system for deploying a fixed wireless access communications network such that a specified level of link performance is provided.

FIG. 10 is a general schematic diagram of a computer system 100, for deploying a fixed wireless access communications network such that a specified level of link performance is maintained. The computer system comprises an input 101 arranged to receive a request to change the communications network;

a processor 103 arranged to determine a level of link performance provided by each of the communications links, taking into account the proposed change; and wherein said processor is further arranged to allow the change to be effected if each of said determined levels of link performance are greater than the specified level of link performance.

A computer program is also provided that is arranged to control the computer system of FIG. 10 such that a fixed wireless access communications network is deployed whilst a specified level of link performance is maintained. The computer program is arranged to control the computer system such that the method of FIG. 4 is implemented.

Positions of subscriber stations and base stations may be determined where required using positioning systems such as GPS and or maps as is known in the art.

A range of applications are within the scope of the invention. These include situations in which it is required to deploy a fixed wireless access communications network whilst providing specified levels of link performance. For example where an existing fixed wireless access network is taken over and it is required to increase the capacity of that network or where a new fixed wireless access network is being created.

What is claimed is:

1. A method of deploying a fixed wireless access communications network such that a specified level of link performance is maintained, said network comprising a plurality of fixed base stations and a plurality of fixed subscriber stations, each subscriber station being arranged to communicate with one of the base stations via a communications link and each of the communications links being associated with one of a plurality of communications channels, said method comprising the steps of:—

(i) receiving a request including a proposed change comprising the addition of an additional subscriber station to the communications network after the fixed wireless access communications network has been deployed;

(ii) selecting a chosen base station with which the additional subscriber station is to communicate if the proposed change is effected;

(iii) selecting a channel for communication between the additional subscriber station and the chosen base station on the basis of a fixed frequency plan;

(iv) determining a level of link performance provided by each of the communications links taking into account the proposed change; and (v) effecting the proposed change if each of said determined levels of link performance are greater than the specified level of link performance.

2. A method as claimed in claim 1 wherein said step (iv) of determining comprises calculating a predicted level of link performance on the basis of location information regarding each base station, and each subscriber station and information about the communications links between each subscriber station and its associated base station.

3. A method as claimed in claim 2 wherein said information about the communications links comprises information about a fixed frequency plan used to arrange the communications network.

4. A method as claimed in claim 2 wherein said predicted link performance levels are determined on the basis of estimated link budgets.

5. A method as claimed in claim 2 wherein said predicted link performance levels are determined on the basis of a calculated value $C/(I+A+N)$, where C is an estimate of a carrier level for the link, I is an estimate an interference level for the link, A is an estimate of an interference level for an adjacent channel for the link, and N is an estimate of a noise level for the link.

6. A method as claimed in claim 1 wherein said step (iv) of determining comprises measuring the level of link performance.

7. A method as claimed in claim 1 wherein said proposed change to the communications network comprises the addition of an additional subscriber station, and wherein said step (v) further comprises, then keeping said additional subscriber station on hold and not effecting the proposed change if at least one of said determined levels of link performance is not greater than said specified level.

8. A method as claimed in claim 7 which further comprises the step of calculating a ratio of a number of additional subscriber stations placed on hold to a total number of requests including a proposed change to the communications network comprising the proposed additional of an additional subscriber station.

9. A method as claimed in claim 1 wherein said channel is selected on the basis of information about the communications network in an arbitrary manner.

10. A method as claimed in claim 1 wherein if at least one of said determined levels of link performance is not greater than said specified level for said channel, the method further comprises selecting a different channel for communication between the additional subscriber station and the chosen base station.

11. A method as claimed in claim 1 wherein the specified level of link performance level is different for different subscriber stations.

12. A method as claimed in claim 1 wherein said fixed wireless access communications network is organised according to a fixed frequency plan.

13. A method as claimed in claim 1 wherein said fixed wireless access communications network is not organised according to a fixed frequency plan.

14. A computer system for deploying a fixed wireless access communications network such that a specified level of link performance is maintained, said network comprising a plurality of fixed base stations and a plurality of fixed subscriber stations, each subscriber station being arranged to communicate with one of the base stations via a communications link and each of the communications links being associated with one of a plurality of communications channels, said computer system comprising:—

(i) an input arranged to receive a request including a proposed change comprising the addition of an additional subscriber station to the communications network after the fixed wireless access communications network has been deployed;

(ii) a processor arranged to determine a chosen base station with which the additional subscriber station is to communicate if the proposed change is effected; selecting a channel for communication between the additional subscriber station and the chosen base station on the basis of a fixed frequency plan; determine a level of link performance provided by each of the communications links, taking into account the proposed changed to the communications network; and wherein said processor is further arranged to allow the proposed change to be effected if each of said determined levels of link performance are greater than the specified level of link performance.

15. A computer program stored on a computer readable medium and arranged to control a computer system such that a fixed wireless access communications network may be deployed whilst a specified level of link performance is maintained, said network comprising a plurality of fixed base stations and a plurality of fixed subscriber stations, each subscriber station being arranged to communicate with one of the base stations via a communications link and each of the communications links being associated with one of a plurality of communications channels, said computer program being arranged to control said computer system such that:—

(i) a request is received including a proposed change comprising the addition of an additional subscriber station to the communications network after the fixed wireless access communications network has been deployed;

(ii) a level of link performance provided by each of the communications links is determined, taking into account the proposed change;

(iii) a chosen base station is selected with which the additional subscriber station is to communicate if the proposed change is effected;

(iv) a channel for communication between the additional subscriber station and the chosen base station is selected on the basis of a fixed frequency plan; and (v) said change is effected if each of said determined levels of link performance are greater than the specified level of link performance.

16. A fixed wireless access communications network comprising:—

(i) a plurality of fixed base stations and a plurality of fixed subscriber stations;

(ii) a communications link associated with one of a plurality of communications channels between each subscriber station and one of the base stations; wherein each said communications link provides a specified level of link performance;

and wherein locations of the base stations are selected according to a fixed frequency plan, and the frequencies of each communications links is selected according to the fixed frequency plan.

17. A method of deploying a fixed wireless access communications network such that a specified level of link performance is maintained, said network comprising a plurality of fixed base stations and a plurality of fixed subscriber stations, each subscriber station being arranged to communicate with one of the base stations via a communications link and each of the communications links being associated with one of a plurality of communications channels, said method comprising the steps of:—
(i) receiving a request including a proposed change comprising the addition of an additional subscriber station to the communications network after the fixed wireless access communications network has been deployed;
(ii) selecting a chosen base station with which the additional subscriber station is to communicate if the proposed change is effected;
(iii) selecting a channel for communication between the additional subscriber station and the chosen base station on the basis of a fixed frequency plan;
(iv) determining a level of link performance provided by each of the communications links taking into account the proposed change;
(v) carrying out one of the group comprising: effecting the proposed change if each of said determined levels of link performance are greater than the specified level of link performance and keeping said additional subscriber station on hold and not effecting the proposed change if at least one of said determined levels of link performance is not greater than said specified level; and
(vi) calculating a ratio of a number of additional subscriber stations placed on hold to a total number of requests including a proposed change to the communications network comprising the proposed additional of an additional subscriber station.

* * * * *